United States Patent [19]

Tobe

[11] Patent Number: 4,847,697
[45] Date of Patent: Jul. 11, 1989

[54] REPRODUCING SPEED CONTROL SYSTEM FOR A VIDEO DISK PLAYER

[75] Inventor: Takao Tobe, Saitama, Japan

[73] Assignee: Pioneer Electronic Corporation, Tokyo, Japan

[21] Appl. No.: 92,344

[22] Filed: Sep. 2, 1987

[30] Foreign Application Priority Data

Sep. 2, 1986 [JP] Japan .................................. 61-207437

[51] Int. Cl.$^4$ ............................................. H04N 5/76
[52] U.S. Cl. .................................... 358/342; 360/10.1; 358/907
[58] Field of Search ........................ 358/312, 342, 907; 360/10.1

[56] References Cited

U.S. PATENT DOCUMENTS 3,987,483 0/1976 Odagiri ................................. 360/10
4,499,505 2/1985 Sugiyama et al. .............. 360/10.1 X

FOREIGN PATENT DOCUMENTS 3129448 7/1981 Fed. Rep. of Germany.
3200857 1/1982 Fed. Rep. of Germany.
3315668 4/1983 Fed. Rep. of Germany.
3325154 7/1983 Fed. Rep. of Germany.

Primary Examiner—James B. Mullins
Attorney, Agent, or Firm—Sughrue, Mion, Zinn, Macpeak, and Seas

[57] ABSTRACT

An apparatus for controlling the reproducing speed for a video disk player in fine speed increments. Every time a vertical synchronizing pulse is delivered the number of tracks to be jumped is determined based on a base speed derived from the integer part of the ratio of an entered speed parameter and half a full scale of a counter. An additional track is jumped when the product of the number of vertical synchronizing pulses and the remainder portion of the above ratio exceeds the full scale of the counter.

3 Claims, 3 Drawing Sheets

REPRODUCING SPEED CONTROL SYSTEM FOR A VIDEO DISK PLAYER

BACKGROUND OF THE INVENTION

1. Field of the Invention

The present invention generally relates to a video disk player. It particularly relates to a reproducing speed control system for a video disk player.

2. Background of the Invention

It is widely known that in conventional video disk players, special reproduction can be carried out in addition to normal play, for example, in a double-speed mode, a triple-speed mode, a still picture mode, a slow-motion mode, and so on. In those video disk players, however, there has been such a disadvantage that a fine change in speed cannot be achieved because in the reproduction it is possible to only set the speed to $\frac{1}{2}$, $\frac{1}{4}$, and so forth of the normal speed in a slow speed mode and only to the normal speed, a double speed, and a triple speed in a fast speed mode.

SUMMARY OF THE INVENTION

It is therefore an object of the present invention to eliminate the foregoing disadvantage in the prior art.

It is another object of the present invention to provide a reproducing speed control system for a video disk player in which reproduction at a desired speed can be realized.

The reproducing speed control system for a video disk player according to the present invention is characterized in that a reproducing speed m/n is set due to entry of a given integer m. A value of an integer portion of a real number obtained from the reproducing speed m/n is used as a base speed. The number of tracks to be jumped is calculated on the basis of the base speed. The information detection point is thereby controlled to perform the jumping operation by the calculated number of tracks to be jumped in synchronism with the vertical synchronizing pulse. Unity is added to the calculated number of tracks to be jumped every time a counter having a full scale of 2n is counted-up by a value of p which is an integer portion of a real number obtained from 2n/l where l is a remainder of the value of m/n.

BRIEF DESCRIPTION OF THE DRAWING

The above and other objects of the present invention will be apparent from the following detailed description taken in conjunction with the accompanying drawings in which.

DETAILED DESCRIPTION OF THE PREFERRED EMBODIMENTS

An embodiment of the reproducing speed control system according to the present invention will be described in detail with reference to the accompanying drawings hereunder.

Figure 1:
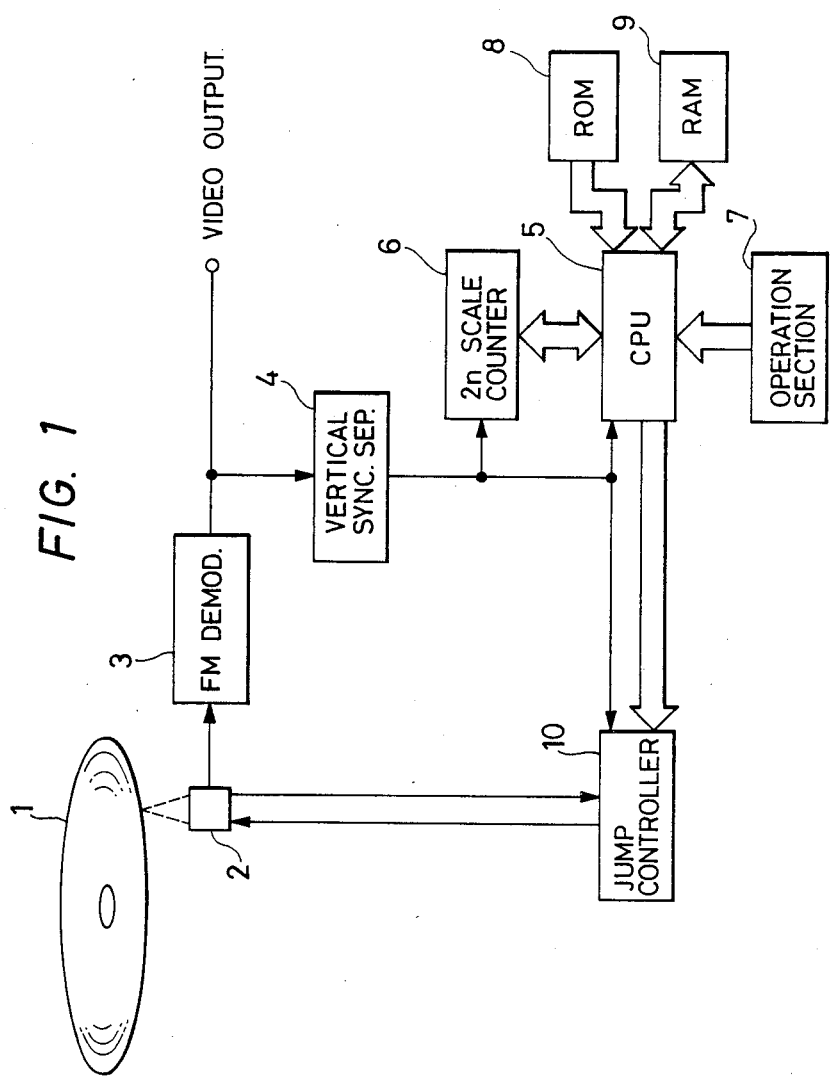
FIG. 1 is a block diagram schematically showing a video disk player to which the reproducing speed control system according to the present invention is applied.

FIG. 1 is a block diagram schematically showing a video disk player to which the reproducing speed control system according to the present invention is applied. In the drawings, information recorded on a video disk 1 is read out by a pickup 2. The read-out high frequency signal of the pickup 2 is demodulated by an FM demodulating circuit 3. The output signal or reproduced video signal from the FM demodulating circuit 3 is applied to a video output terminal as well as a vertical synchronizing separation circuit 4. A vertical synchronizing component contained in the reproduced video signal applied to the vertical synchronizing separation circuit 4 is separately extracted and supplied as a reproduced vertical synchronizing pulse to a central processing unit (CPU) 5 and counter 6 of a full scale of 2n (n being an integer), for example, of a full scale of 120. When an instruction of reproduction in a special mode such as a slow speed play mode, a fast speed play, a still picture mode, or the like, is generated from an operation panel 7, the CPU 5 operates to execute processing on the basis of a processing program written in advance in a read-only memory (ROM) 8. It thereby performs calculations to obtain the number of recording tracks (not shown) of the video disk 1 to be jumped by an information detection point (a light spot) of the pickup 2. The number of jumped tracks is determined in accordance with the designated reproducing speed in synchronism with the vertical synchronizing pulse on the basis of the count of the counter 6. Further, the CPU 5 operates to write into or from a random access memory (RAM) 9 and to read information necessary for executing the program.

The information as to the number of tracks to be jumped, which has been calculated by the CPU 5, is supplied to a jump control circuit 10. The jump control circuit 10 is arranged to send a jump pulse having a pulse width or a crest value corresponding to the number of tracks to be jumped to the pickup 2 in synchronism with the vertical synchronizing pulse. The pickup 2 is provided with a built-in tracking actuator for biasing the information detection point perpendicularly to the recording tracks so that a jumping operation of the information detection point with respect to the recording tracks is performed by the actuator. The jumping operation is executed, for example, on the basis of the method disclosed in Japanese Patent Application No. 8885/1985 filed by the same applicant as that of this application.

Next, referring to the flowcharts of FIGS. 2 and 3, a description will be made as to the procedure of the processing of the reproducing speed control system executed by the CPU 5 according to the present invention.

Figure 2:
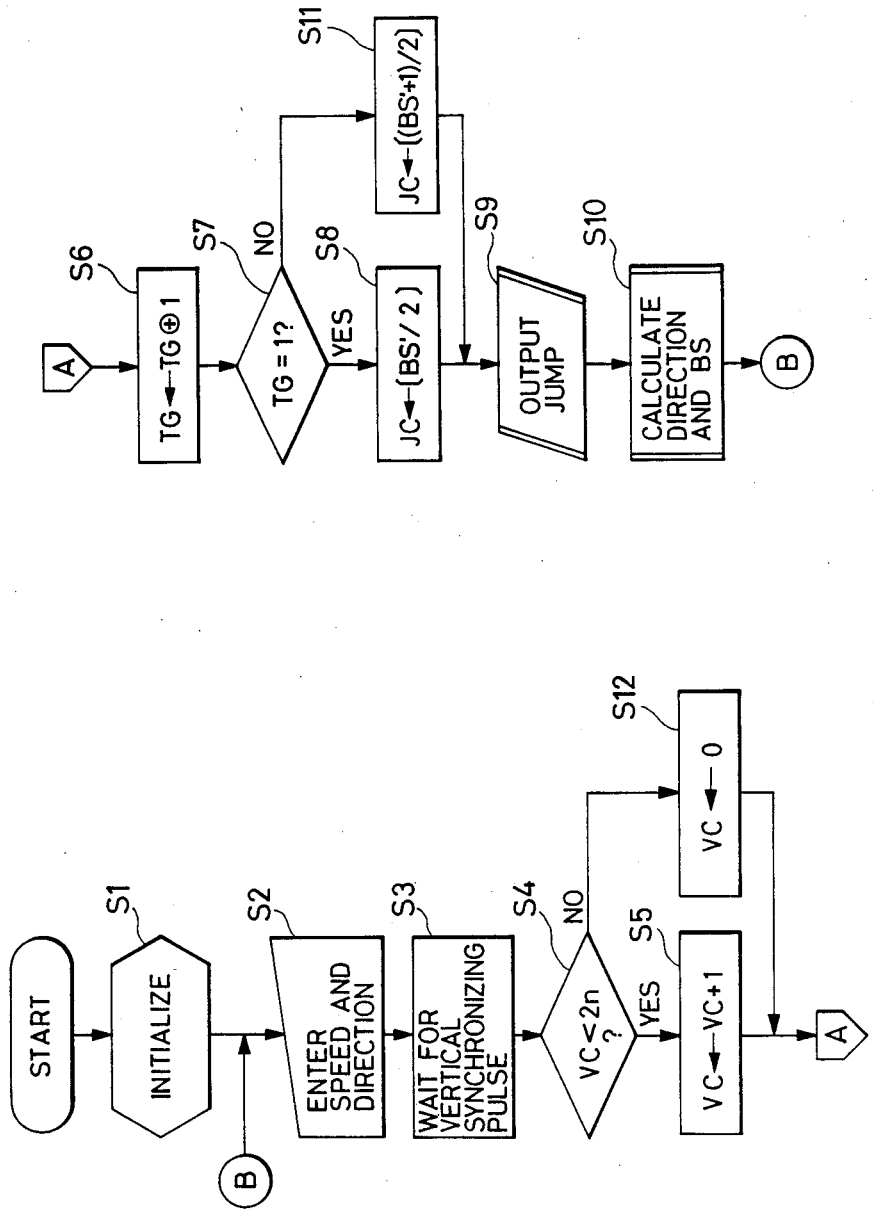
FIGS. 2 and 3 are flowcharts for executing the processing procedures of the reproducing speed control system according to the present invention by the CPU.

In FIG. 2, initializing is performed in Step S1 such that the counter 6 is reset and the state of a toggle TG is set to "0". In operation, the state of the toggle TG is alternately switched between "1" and "0" every time a vertical synchronizing pulse is applied to it. Upon entry from the operation section 7 of a reproducing speed and its direction (in Step S2), the operation waits in Step S3 for application of a vertical synchronizing pulse. The reproducing speed can be set as a multiple of 1/60 (=2/120) because the video disk player is provided with the counter 6 of a full scale of 120 (full scale of 2n) and one scene is composed of two fields in the video disk 1. The setting is made by entering a desired integral number m relative to n (n=60).

Assume now that, by way of example, "127" is entered as the value of m so that the reproducing speed is set to 127/60 (=m/n) times as high as a normal speed and the direction of the reproducing speed is forward. The count of the counter 6 is represented by VC and is compared against the full scale value 2n of the counter in Step S4. Upon application of the vertical synchronizing pulse, the operation is shifted to Step S5 through Step S4, so that the counter 6 of a full scale of 120 is counted up (in Step S5). Next, the toggle TG is changed which is performed by exclusive ORing between the preceding value "0" set in the toggle TG and the value "1" (in Step S6). In the initial pass through Step S6, TG is set to "1". If judgment proves that TG=1 in Step S7, the operation is shifted to the next Step S8 in which a calculation is to be made to obtain the number of tracks JC to be jumped. However, the calculation for obtaining a base speed BS has not been executed yet. Therefore, the operation is shifted from Step S8 to Step S10 through Step S9 while the state is left as it is.

In Step S10, setting of the reproducing direction and the calculation for obtaining the base speed BS are executed. The procedure of the calculation executed in Step S10 is described now in reference to the flowchart in FIG. 3.

The reproducing direction is set in Step S101 on the basis of the input information of the reproducing speed and its direction from Step S2. Then calculation is made to obtain a base speed BS and a fine adjustment acceleration speed l (in Steps S102 and S103). The base speed BS is obtained through the following expression of calculation $$BS = [m/n]$$

where the square brackets [ ] is a Gaussian symbol which means a value of an integral portion of a real number obtained from the expression in the brackets. In the example of the embodiment, m=127 and n=60, and therefore the base speed BS=2 is obtained. The fine adjustment acceleration speed l is obtained through the following expression of calculation for the modulus l=mod (m, n), that is, $$l = m - [m/n]*n$$

As a result, the fine adjustment acceleration speed l=7 is obtained. If the test in Step S104 proves that this fine adjustment acceleration speed l is smaller than n/2, the operation is shifted to the step S105 in which the integral value [2n/l] is calculated and a value p (p=17 in this case) obtained by the calculation is stored in a work register $WK_0$ incorporated in the CPU 5.

Next, the integral value [VC/P] is calculated on the basis of the count VC of the counter 6 and the value obtained by this calculation is stored in a first work register $WK_1$ (in Step S106). Further calculation is made for the expression [(VC−1)/P], and the integral value obtained by this calculation is stored in a second work register $WK_2$ (in Step S107). Here, the value of the first work register $WK_1$ is successively changed to be "0" when the count VC of the counter 6 is within the range of 1-16, to be "1" when the count VC is within the range of 17-33, to be "2" for the range of 34-50, to be "3" for the range of 51-67, etc. The value of the second work register $WK_2$, on the other hand, is successively changed to be "0" when the count VC is within a range of 1-17, to be "1" for the range of 18-34, to be "2" for the range of 35-51, to be "3" for the range of 52-68, etc.

If a test in Step S108 proves again that the fine adjustment acceleration speed l is smaller than n/2, the operation is shifted to Step S109 in which judgment is made as to whether or not the value of the first work register $WK_1$ is equal to that of the second work register $WK_2$. These values are not coincident with each other when the count VC of the counter 6 takes any one of the seven boundary values "17", "34", "51", "68", "85", "102", and "119", but are coincident with each other when the count VC takes a value other than the foregoing seven boundary values. If a test in step S109 proves that the respective values of the work registers $WK_1$ and $WK_2$ are coincident with each other, the operation is shifted to Step S110 in which judgment is made as to whether or not the base speed BS is equal to "0". In this case B=2 and therefore the operation is shifted to Step S111 in which judgment is made as to whether or not the reproducing direction is the reverse one. Since the set direction is the forward one, the operation is shifted to Step S112 in which calculation is made to subtract "1" from the base speed BS to obtain BS=1 in this case. After establishment of BS=1, the operation is returned back to the main flow of FIG. 2.

If, on the contrary, the test in Step S109 proves that the value of the first work register $WK_1$ is not coincident with that of the second work register $WK_2$, the operation is immediately shifted to Step S113 in which judgment is made as to whether or not the base speed BS is equal to "0". In this case BS=2, and therefore the operation is shifted to Step S114 in which judgment is made again as to whether or not the base speed BS is equal to "0". If the answer is no, the value "2" is added to the base speed BS to thereby obtain BS=4 in Step S115.

The operation is then shifted to Step S112 through the steps S110 and S111 to thereby obtain BS=3. Then the operation is returned back to the main flow of FIG. 2.

That is, in the case where the base speed BS is equal to "2", BS'=3 is set when the count VC of the counter 6 takes any one of the seven boundary values "17", "34", "51", "68", "85", "102", and "119", while BS'=1 is set when the count VC takes a value other than the abovementioned seven boundary values. Then, the operation is returned back to the main flow.

In the main flow of FIG. 2, upon completion of the calculation for obtaining the base speed BS in Step S10, the operation is returned back to Step S2. Further, the operation is shifted to Step S5 through Steps S3 and S4 and the counter 6 is incremented in Step S5. Next, the operation is shifted to Step S7 through Step S6 and a test is made as to whether or not TG=1 in Step S7. The state of the toggle TG is alternately switched over between "1" and "0" every time the counter 6 is incremented by the operation in Step S6. When the count VC of the counter 6 is an odd number, the operation is shifted to the step S8 in which the number of track jumping JC is obtained from the calculation of [BS'/2]. On the other hand, when the count VC is an even number, the operation is shifted to Step S11 in which number of track jumping JC is obtained from the calculation of [(BS'+1)/2].

In the case where BS'=1, JC=0 is obtained when the count VC of the counter 6 is an odd number, while JC=1 is obtained when the count VC is an even number. The CPU 5 in the Step S9 sends the track number information respectively corresponding to JC=0 to the jump control circuit 10 when the count value VC of the counter 6 is an odd number or corresponding to JC=1 when the count value VC is an even number. As a result, one track jumping is performed every two vertical synchronizing pulses in synchronism with the vertical synchronizing pulse due to the operation of the jump control circuit 10.

In the case where BS'=3, on the other hand, JC=1 is obtained when the count VC of the counter 6 is an odd number, while JC=2 is obtained when the count VC is an even number. That is, the count VC of the counter 6 is counted up by one after the arithmetic operation of the base speed BS, so that the jumping is carried out with one additional track only when the count VC is a value one greater than the previously described boundary values, that is, any one of "18", "35", "52", "69", "86", "103", and "120".

The operation described above is repeated to thereby make it possible to realize reproduction at the speed of 127/60 times the normal speed. Further, when the count VC of the counter 6 has reached 2n in Step S4, the operation is shifted to Step S12 in which the counter 6 is cleared. Then the operation is shifted to Step S6.

Although the operation has been described for the case where the fine adjustment acceleration speed 1 is smaller than n/2 in the foregoing explanation, the operation will now be described for the case where the fine adjustment acceleration speed 1 is equal to n/2 or more.

Figure 3:
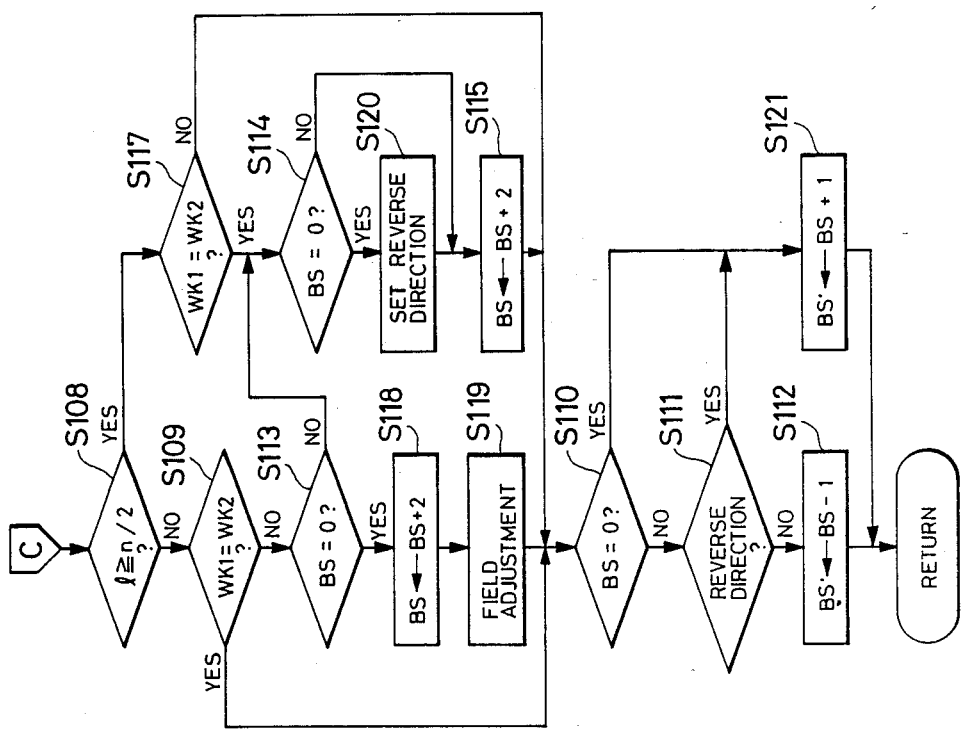
Figure 3:
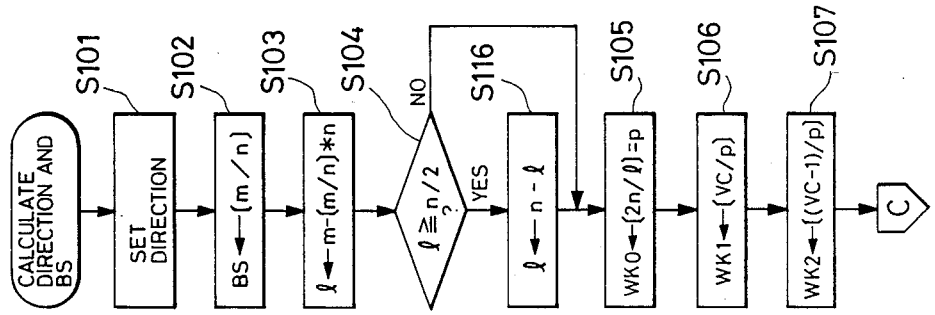

In the flow of FIG. 3, if the test in Step S104 proves that $l \geq n/2$, n−1 is calculated and this value is substituted for the fine adjustment acceleration speed 1 in Step S116. The operation is shifted to Step S117 through Steps S105 to S108, and judgment in Step S117 is made as to whether or not the value of the first work register $WK_1$ is coincident with that of the second work register $WK_2$. As opposed to the case where $l < n/2$, the operation is directly shifted to Step S110 when the values of the work registers $WK_1$ and $WK_2$ are not coincident with each other, while the operation is shifted to the Step S110 through Steps S114 and S115 when the values of the work registers $WK_1$ and $WK_2$ are coincident with each other. As a result, assuming that the fine adjustment acceleration speed 1 which is set again is, for example, "7", jumping is carried out over one additional track only when the count VC of the counter 6 is a value other than "18", "35", "52", "69", "86", "103" or "120".

Further, when the set reproducing speed is lower than the normal speed, the base speed BS obtained by the calculation in Step S102 of the flow in FIG. 3 is "0". Therefore, in the case where $l < n/2$ and $WK_1 \neq WK_2$, the value "2" is added to the base speed BS to make BS=2 in Step S118 and then field adjustment is carried out in Step S119. In this case the reproducing speed is extremely low so that a so-called flapping of a reproduced scene is apt to be conspicuous. Therefore, in order to avoid this phenomenon, the field adjustment is carried out to cause reproduction to always be carried out from the first field. In the case where $l \geq n/2$ and $WK_1 = WK_2$, on the other hand, the reverse direction is set in Step S120. Further, in the case where BS=0 and the reproducing direction is the reverse one, an arithmetic operation is made to add "1" to the base speed BS in the Step S121. Then, the operation is returned back to the main flow of FIG. 2.

In the foregoing embodiment, the base speed BS' is an odd number or an even number when BS is respectively an even number or an odd number. Further, the respective values JC obtained by the arithmetic operations in the Steps S8 and S11 of FIG. 2 are not coincident with each other when the base speed BS is an even number, while the respective values JC are coincident with each other when the BS is an odd number. Therefore jumping control is changed-over between the case where the base speed BS is an even number and the case where the BS is an odd number on the basis of the calculated value JC. However, for example, arrangement may be made such that a step of judging whether the base speed BS is an odd number or an even number is inserted before Step S6 to thereby directly shift the operation to Step S8 when the base speed BS is an odd number.

As described above, in the reproducing speed control system according to the present invention, the set reproducing speed is divided into the base speed and the fine adjustment acceleration speed is not larger than a value of ½ times as high as the base speed. The number of tracks to be jumped is increased by one at a suitable interval obtained on the basis of this fine adjustment acceleration speed. Therefore, it is possible to desirably set the reproducing speed within a range of resolution of the counter for counting a vertical synchronizing pulse.

What is claimed is:

1. A reproducing speed control system for a video disk player, comprising:
   means for jumping an information detection point across recording tracks of a video disk in synchronism with a vertical synchronizing pulse;
   a counter of a full scale of 2n, wherein n is an integer, for counting said vertical synchronizing pulse to thereby control a reproducing speed by using a jumping operation of said jumping means;
   means for entering an integer m to thereby set said reproducing speed at m/n;
   means for obtaining an integer portion of said reproducing speed to thereby set a base speed;
   means for calculating a number of tracks of said video disk to be jumped by said information detection point in synchronism with said vertical synchronizing pulse on a basis of said base speed;
   means for incrementing said counter in synchronism with said vertical synchronizing pulse; and
   means for adding unity to said calculated number of tracks each time said counter is counted up by a value of p, p being an integer portion of 2n/L, L being a remainder portion of m/n.

2. A reproducing speed control system for a video disk player according to claim 1, wherein said adding means, in the case where $p < n/2$, adds unity to said calculated number of tracks to be jumped every time said counter is counted up by said value of p, while in the case where $p \geq n/2$, said adding means adds unity to said number of tracks to be jumped every time said counter is counted up except the case when said counter is counted up by a value of (n−p).

3. A reproducing speed control method for a video disk player, comprising:
   jumping an information detection point across recording tracks of a video disk in synchronism with a vertical synchronizing pulse;
   counting up said vertical synchronizing pulse to a full scale of 2n, wherein n is an integer, to thereby control a reproducing speed by using said jumping operation;
   entering an integer m to thereby set said reproducing speed at m/n;
   obtaining an integer portion of said reproducing speed to thereby set a base speed;

calculating a number of tracks of said video disk to be jumped by said information detection point in synchronism with said vertical synchronizing pulse on a basis of said base speed;

incrementing said counting up in synchronism with said vertical synchronizing pulse; and adding unity to said calculating number of tracks each time said pulse is counted up by a value of p, p being an integer portion of $2n/L$, L being a remainder portion of $m/n$.

* * * * *